(12) United States Patent
Wei

(10) Patent No.: US 11,845,508 B2
(45) Date of Patent: Dec. 19, 2023

(54) BICYCLE HEADSET

(71) Applicant: TIEN HSIN INDUSTRIES CO., LTD., Taichung (TW)

(72) Inventor: Wei-Chih Wei, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 373 days.

(21) Appl. No.: 17/379,892

(22) Filed: Jul. 19, 2021

(65) Prior Publication Data

US 2022/0371683 A1 Nov. 24, 2022

(30) Foreign Application Priority Data

May 19, 2021 (TW) ................................. 110118076

(51) Int. Cl.
*B62K 21/18* (2006.01)
*B62K 21/06* (2006.01)
*B62K 21/10* (2006.01)
*B62K 21/08* (2006.01)

(52) U.S. Cl.
CPC .............. *B62K 21/18* (2013.01); *B62K 21/06* (2013.01); *B62K 21/08* (2013.01); *B62K 21/10* (2013.01)

(58) Field of Classification Search
CPC ........ B62K 21/18; B62K 21/06; B62K 21/08; B62K 21/10
See application file for complete search history.

(56) References Cited

U.S. PATENT DOCUMENTS

| 5,865,069 A * | 2/1999 | Edwards | B62K 21/12 280/279 |
| 7,296,813 B2 * | 11/2007 | Montague | B62K 15/00 280/279 |
| 11,338,881 B2 * | 5/2022 | Tang | B62K 21/24 |

(Continued)

FOREIGN PATENT DOCUMENTS

| CN | 210019996 U | 2/2020 |
| TW | M250861 U | 11/2004 |

OTHER PUBLICATIONS

Search report for TW110118076, dated Jan. 4, 22, Total of 1 page.

(Continued)

*Primary Examiner* — Kevin Hurley
*Assistant Examiner* — Marlon A Arce
(74) *Attorney, Agent, or Firm* — Apex Juris, pllc; Hilde Coeckx

(57) ABSTRACT

A bicycle headset includes a fixed member, wherein the headset is fixed onto a headtube of a bicycle via the fixed member. A steerer tube of a fork passes through the headtube and is connected to a fork portion. The fixed member has a first contour including a first guiding section, a second section, and a joint section that connects the first section and the second section and is located at the highest site among the first contour. A rotating member is fixed onto the steerer tube. A movable member is disposed onto the rotating member and is movable along an axial direction of the steerer tube. An elastic member urges the movable member to allow a second contour of the movable member to constantly touch the first contour of the fixed member, thereby preventing a stem connected to the steerer tube from overly turned and assisting to steer back.

8 Claims, 12 Drawing Sheets

(56) References Cited

U.S. PATENT DOCUMENTS

| | | | | |
|---|---|---|---|---|
| 2003/0123925 A1* | 7/2003 | Kinzler | ............... | B62K 21/18 |
| | | | | 403/109.5 |
| 2013/0319169 A1* | 12/2013 | Savard | ............... | B62K 21/18 |
| | | | | 74/551.8 |
| 2018/0043960 A1* | 2/2018 | Coaplen | ............... | B62K 21/06 |
| 2020/0277020 A1 | 9/2020 | Tang | | |

OTHER PUBLICATIONS

English abstract for TWM250861, Total of 1 page.
English abstract for CN210019996, Total of 1 page.

\* cited by examiner

BICYCLE HEADSET

BACKGROUND OF THE INVENTION

1. Technical Field

The present disclosure relates generally to a device of a bicycle, and more particularly to a bicycle headset that could assist the bicycle stem to be returned back.

2. Description of Related Art

Generally, a conventional structure for returning a bicycle stem is setting a spring between a fork and a frame of a bicycle. When the bicycle stem is rotated to drive the fork to pull the spring, the spring could provide resilience for returning the stem back.

The structure for returning the bicycle stem could provide resilience for the turned stem to return. However, since the spring is exposed outside, the structure is not only easily damaged due to collision, but also easily failed due to accumulated dirt.

BRIEF SUMMARY OF THE INVENTION

Since a conventional structure for guiding the bicycle stem to steer back is exposed outside, the structure is easily damaged. In view of the above, the primary objective of the present disclosure is to provide a structure designed for a bicycle, wherein the structure could generate a resilience for steering back after a steerer tube of a fork is turned and is mounted in the bicycle without exposing outside, thereby assisting the stem of the bicycle to steered back after the stem is turned.

The present disclosure provides a headset for a bicycle, wherein the bicycle includes a frame and a fork. The frame has a headtube. The fork has a fork portion and a steerer tube that is connected to the fork portion. The steerer tube rotatably passes through out the headtube, and an axis of rotation of the steerer tube is defined. The headset includes a fixed member, a rotating member, a movable member, and an elastic member.

The fixed member is disposed on a top end of the headtube.

The rotating member is fixed to the steerer tube, wherein the rotating member is rotated as a rotation of the steerer tube.

The movable member is engaged with the rotating member and is movable in a direction parallel to the axis of rotation without rotating relative to the rotating member.

A reference plane is defined to be perpendicular to the axis of rotation and pass through the top end of the headtube. One of the fixed member and the movable member has a first contour, and the other one of the fixed member and the movable member has a second contour. The first contour is located at an outside of the steerer tube and surrounds at least a part of a circumferential wall of the steerer tube. The first contour has a first section, a second section, and a joint site that is formed between the first section and the second section. When the fixed member has the first contour, a minimum distance between the joint section and the reference plane is greater than a minimum distance between any point of either the first section or the second section and the reference plane. When the movable member has the first contour, the minimum distance between the joint section and the reference plane is shorter than the minimum distance between any point of either the first section or the second section and the reference plane.

The elastic member is adapted to urge the movable member in an axial direction of the axis of rotation to keep the second contour constantly touching the first contour of the fixed member.

The headset of the present disclosure is engaged with the headtube. The steerer tube of the bicycle is engaged with the stem. Since the structure for guiding the bicycle stem to steer back and the spring are disposed in the headset, the structure is not easily damaged by a collision or is dirtied by mud or soil.

The fixed member is fixedly engaged with the headtube. The movable member is rotated as a rotation of the stem, the steerer tube, and the rotating member. Since the joint section is the highest site or the lowest site of the first contour relative to a portion where the steerer tube is connected to the fork portion, so that the second contour of the movable member is moved along either the first section or the second section of the first contour, after the movable member is rotated as the rotation of the stem and the steerer tube. Thus, the movable member is moved along the axial direction of the rotating member to gradually compressed the elastic member. The resilience provided by the elastic member is increased gradually to resist the rotation of the movable member, the steerer tube, and the stem, thereby preventing the stem from overly steering and assisting the stem and the steerer tube to steer back. When the bicycle stem bearing a load, the rider of the bicycle could steer the stem more smoothly and easily.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

As illustrated in FIG. 1 to FIG. 4, a bicycle headset 100 of an embodiment according to the present disclosure is a headset 20 which is mounted on a bicycle 10.

Figure 1:
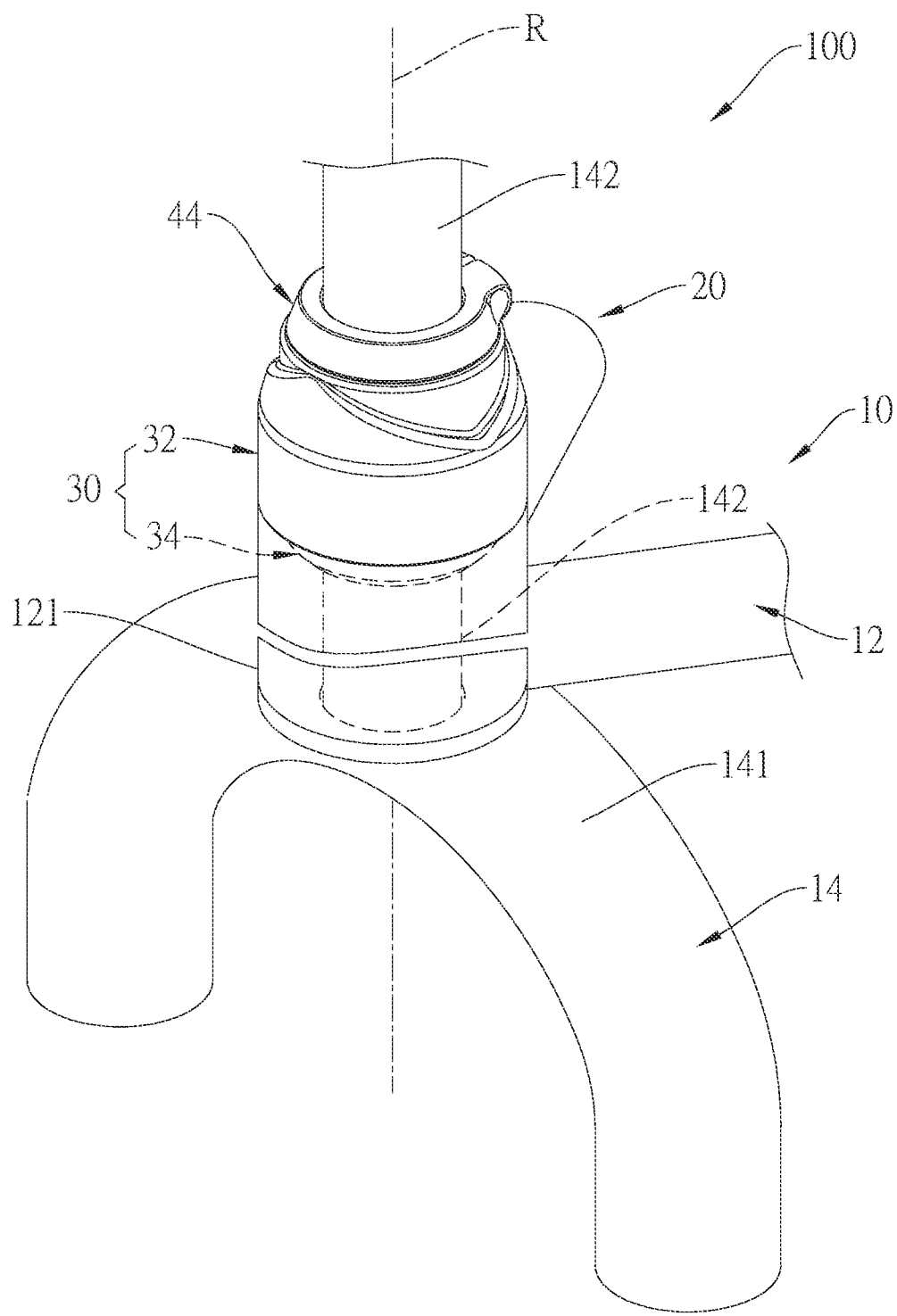
FIG. 1 is a perspective view of the bicycle headset of an embodiment according to the present disclosure, which is mounted on the bicycle.
Figure 2A:
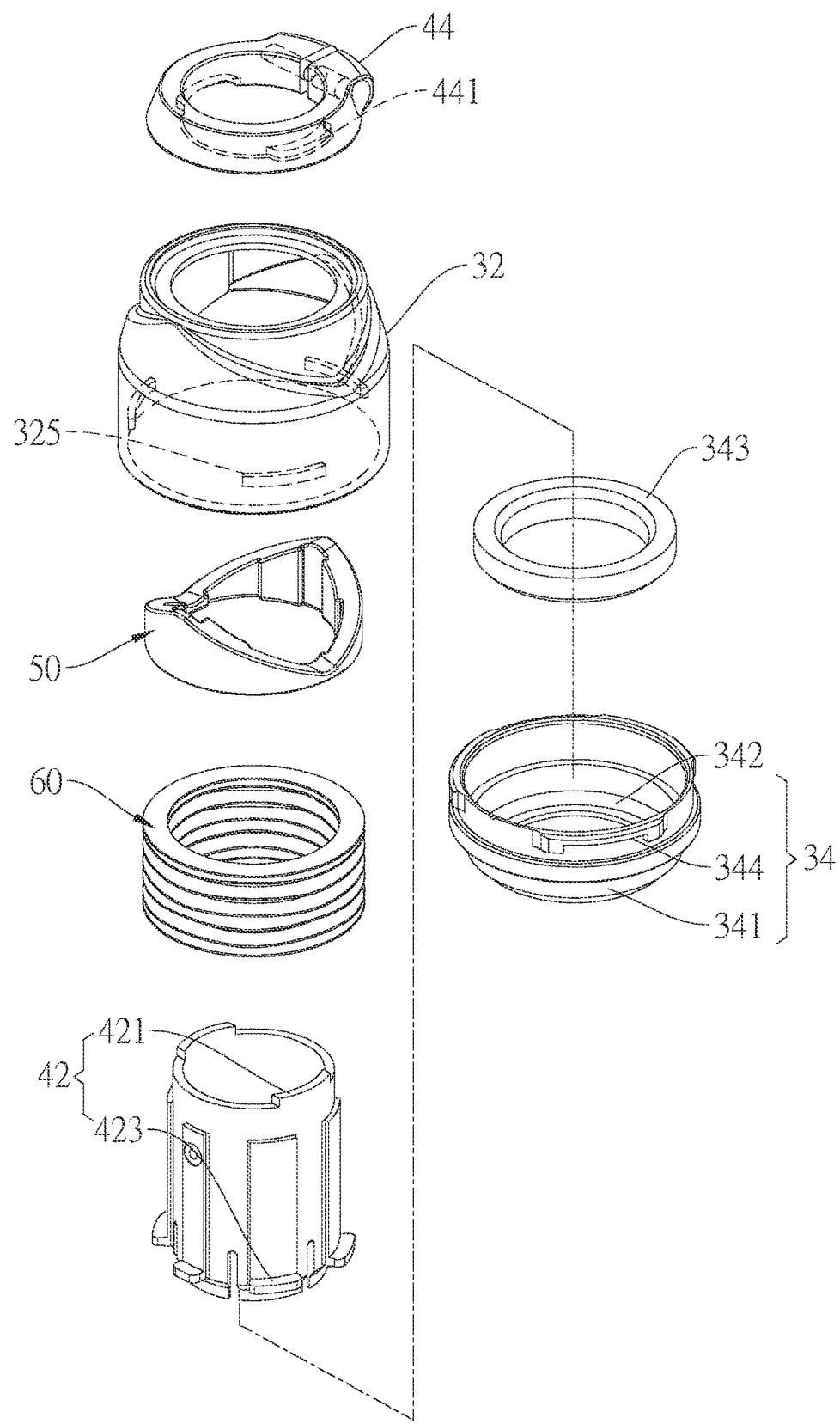
FIG. 2A is an exploded view of the bicycle headset of the embodiment according to the present disclosure.
Figure 2B:
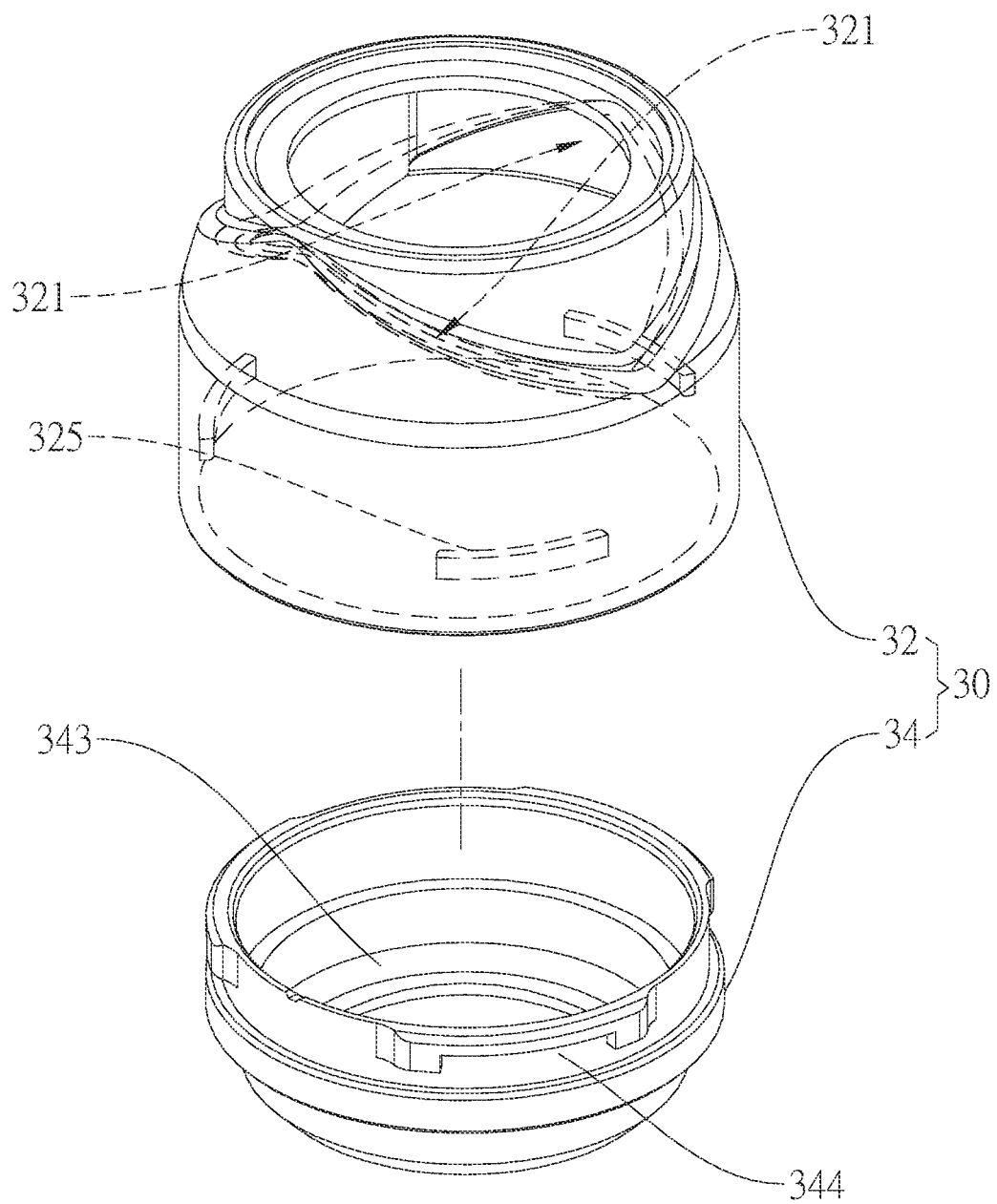
FIG. 2B is an exploded view of the fixed member of the bicycle headset of the embodiment according to the present disclosure.
Figure 2C:
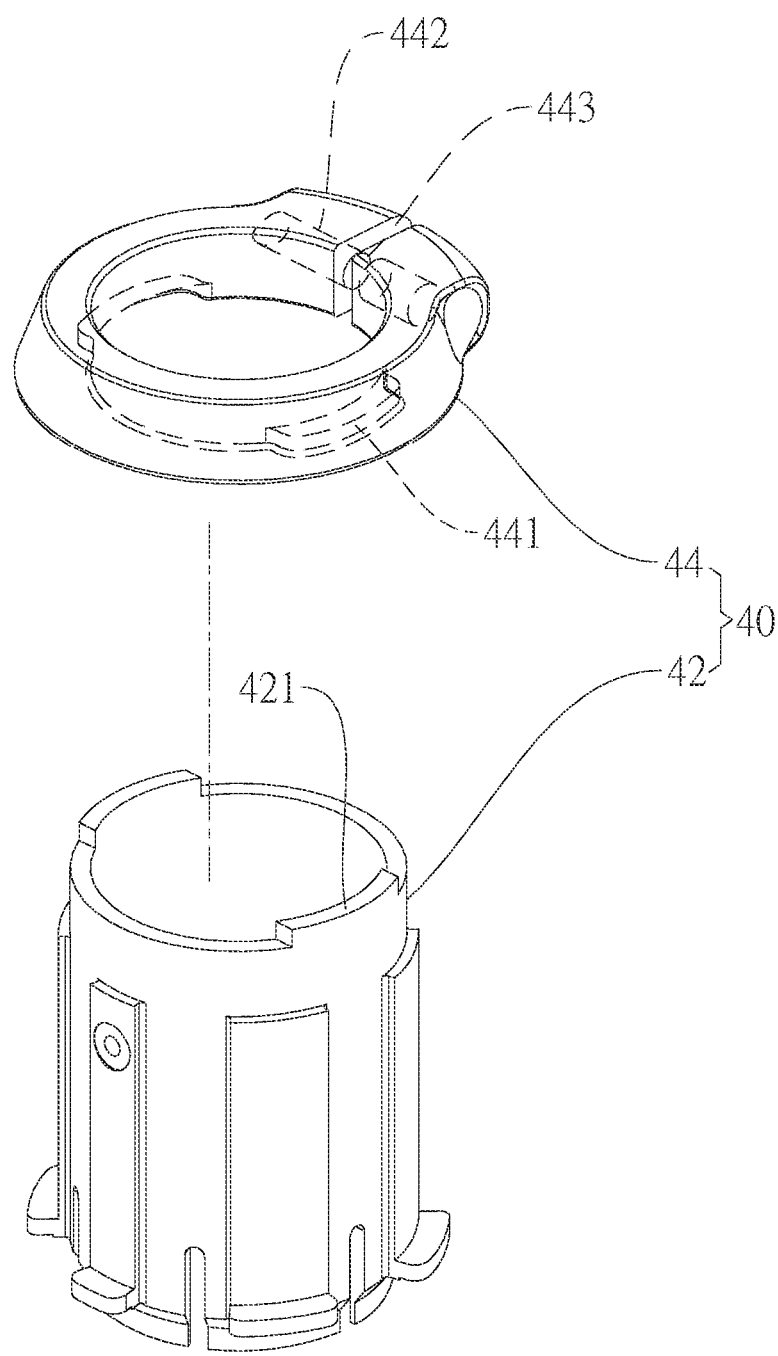
FIG. 2C is an exploded view of the rotating member of the bicycle headset of the embodiment according to the present disclosure.
Figure 2D:
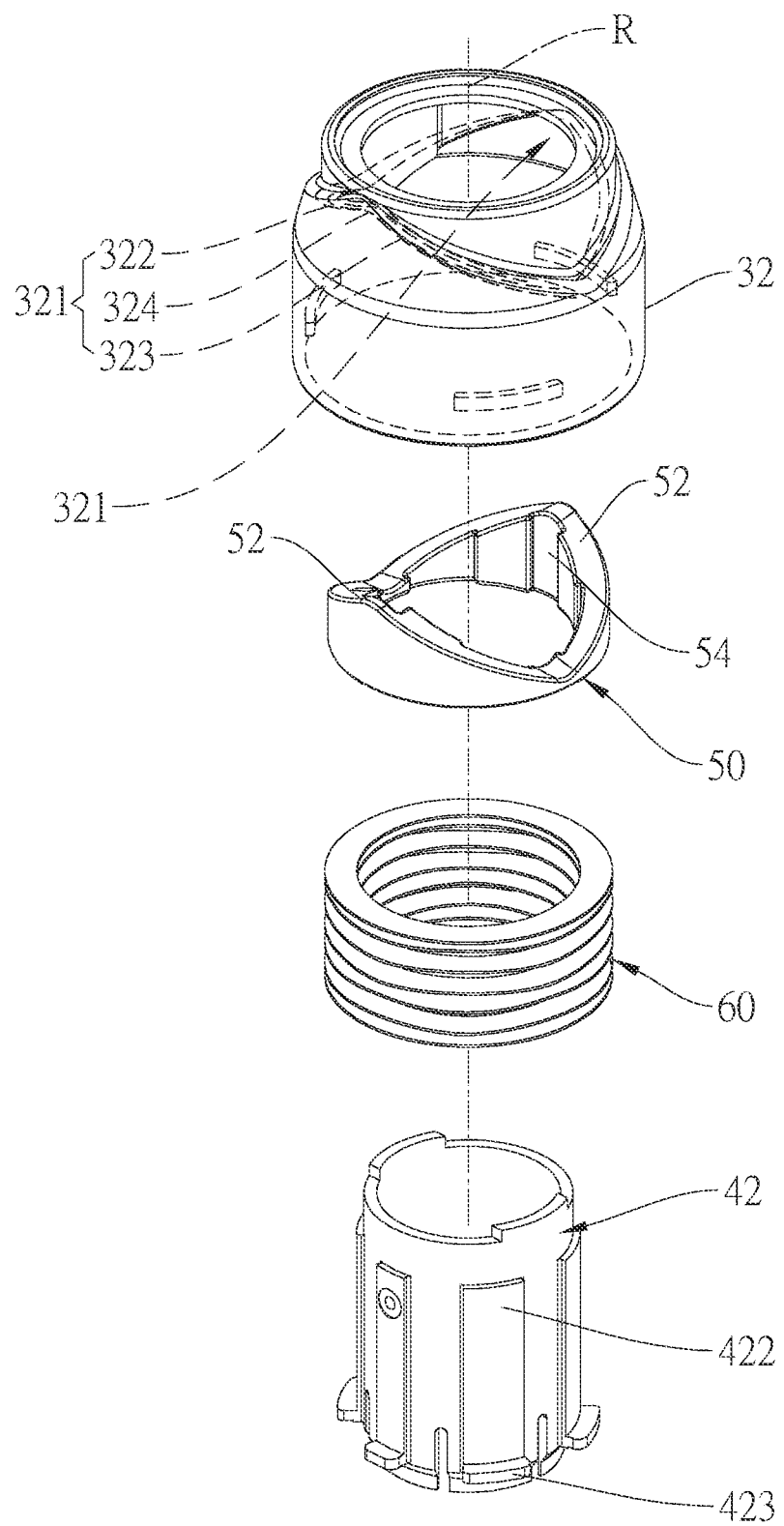
FIG. 2D is a partially exploded view of the bicycle headset of the embodiment according to the present disclosure, showing the top cover, the movable member, the elastic member, and the sliding track member that are detached.

As illustrated in FIG. 1, the bicycle 10 includes a frame 12 and a fork 14. The frame 12 has a headtube 121. The fork 14 has a fork portion 141 and a steerer tube 142 which is connected to the fork portion 141, wherein the steerer tube 142 passes through out a top end of the headtube 121 and the headset 20 to be engaged with a stem of the bicycle 10, and the fork portion 141 is located below the headtube 121.

The headset 20 is engaged with the top end of the headtube 121. The steerer tube 142 passes through the headset 20 in a way that the steerer tube 142 is rotatable around an axis of rotation R. As illustrated in FIG. 1 and FIG. 2A to FIG. 2D, the headset 20 includes a fixed member 30, a rotating member 40, a movable member 50, and an elastic member 60.

The fixed member 30 is disposed on the headtube 121 and has a first contour 321 for guiding the movable member 50 to move, wherein the first contour 321 is located at an outside of the steerer tube 142 and surrounds at least a part of a circumferential wall of the steerer tube 142. The first contour 321 has a first section 322 and a second section 323 that correspond to a clockwise direction of rotation and a counter-clockwise direction of rotation of the steerer tube 142, respectively. A joint site 324 is formed between the first section 322 and the second section 323.

Figure 3:
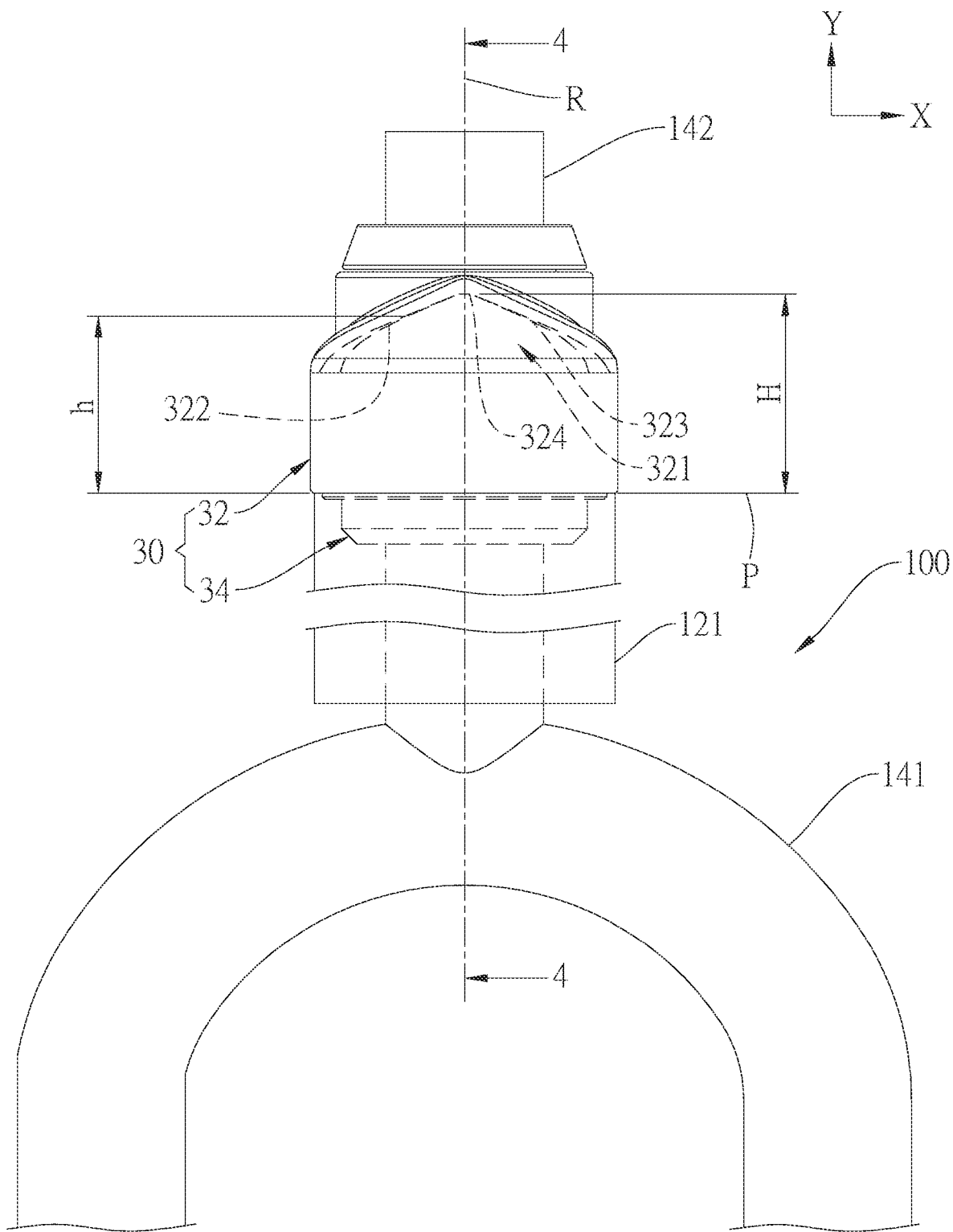
FIG. 3 is a front view of the bicycle headset of the embodiment shown in FIG. 1.
Figure 4:
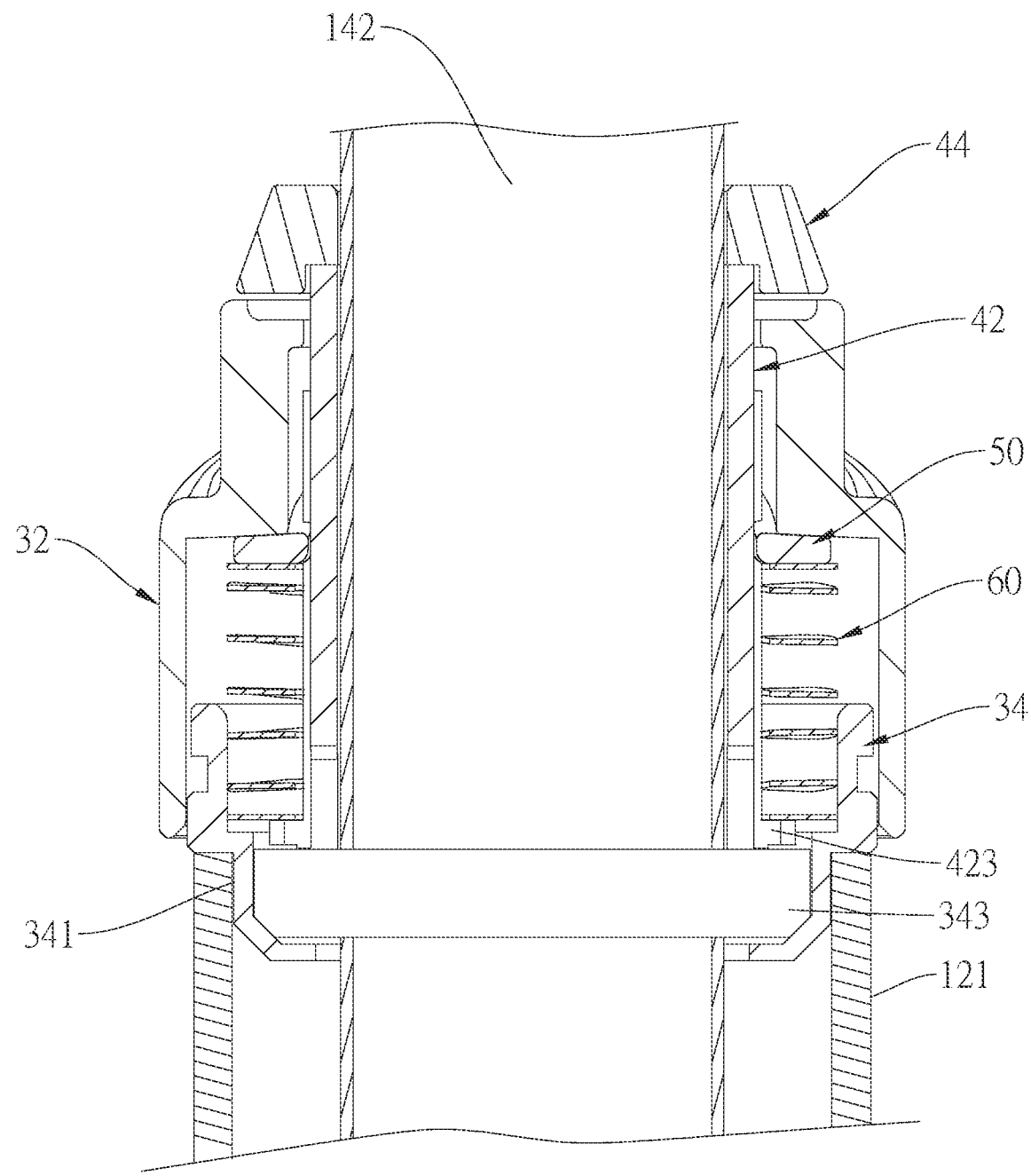
FIG. 4 is a sectional view taken along the 4-4 line in FIG. 3.

As illustrated in FIG. 3, a reference plane P is defined to be perpendicular to the axis of rotation R and pass through the top end of the headtube 121. The joint section 324, located at a center of the first contour 321, is the highest, and a right side and a left side of the first contour 321 are gradually declined. In other words, a minimum distance H between the joint section 324 and the reference plane P is greater than a minimum distance h between any point of either the first section 322 or the second section 323 and the reference plane P.

The rotating member 40 is fixed to the steerer tube 142, so that the rotating member 40 could be rotated in the same direction as the steerer tube 142 is rotated. Namely, when the steerer tube 142 is rotated in the clockwise direction of rotation, the rotating member 40 is driven to rotate clockwise. When the steerer tube 142 is rotated in the counter-clockwise direction of rotation, the rotating member 40 is driven to rotate counter-clockwise.

The movable member 50 is disposed on the rotating member 40 and is restricted from rotating relative to the rotating member 40. However, the movable member 50 could move in a direction, which is parallel to the axis of rotation R, relative to the rotating member 40. The movable member 50 has a second contour 52. In the current embodiment, a shape of the second contour 52 is complementary to a shape of the first contour 321. However, in other embodiments, the second contour 52 could be any shape as long as the shape of the second contour 52 allows the second contour 52 to slide along a surface of the first contour 321.

The elastic member 60 exerts a force to the movable member 50 in an axial direction of the axis of rotation R. Via urging the movable member 50 by the elastic member 60, the second contour 52 of the movable member 50 constantly touches the first contour 321 of the fixed member 30.

Figure 6A:
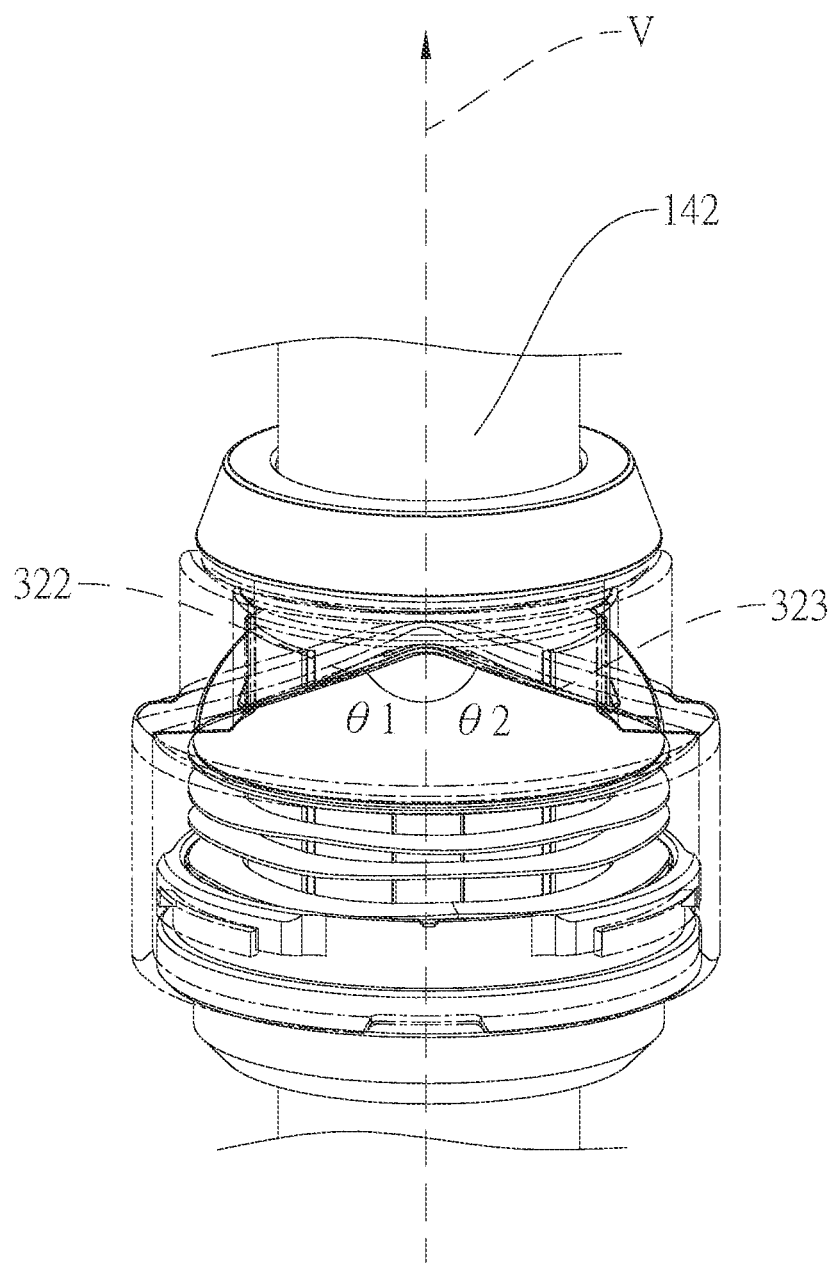
FIG. 6A to FIG. 6C are perspective views of the headset of the present disclosure, wherein the fixed member is depicted in transparent, showing the steerer tube is turned and then is returned to straighten out.
Figure 6B:
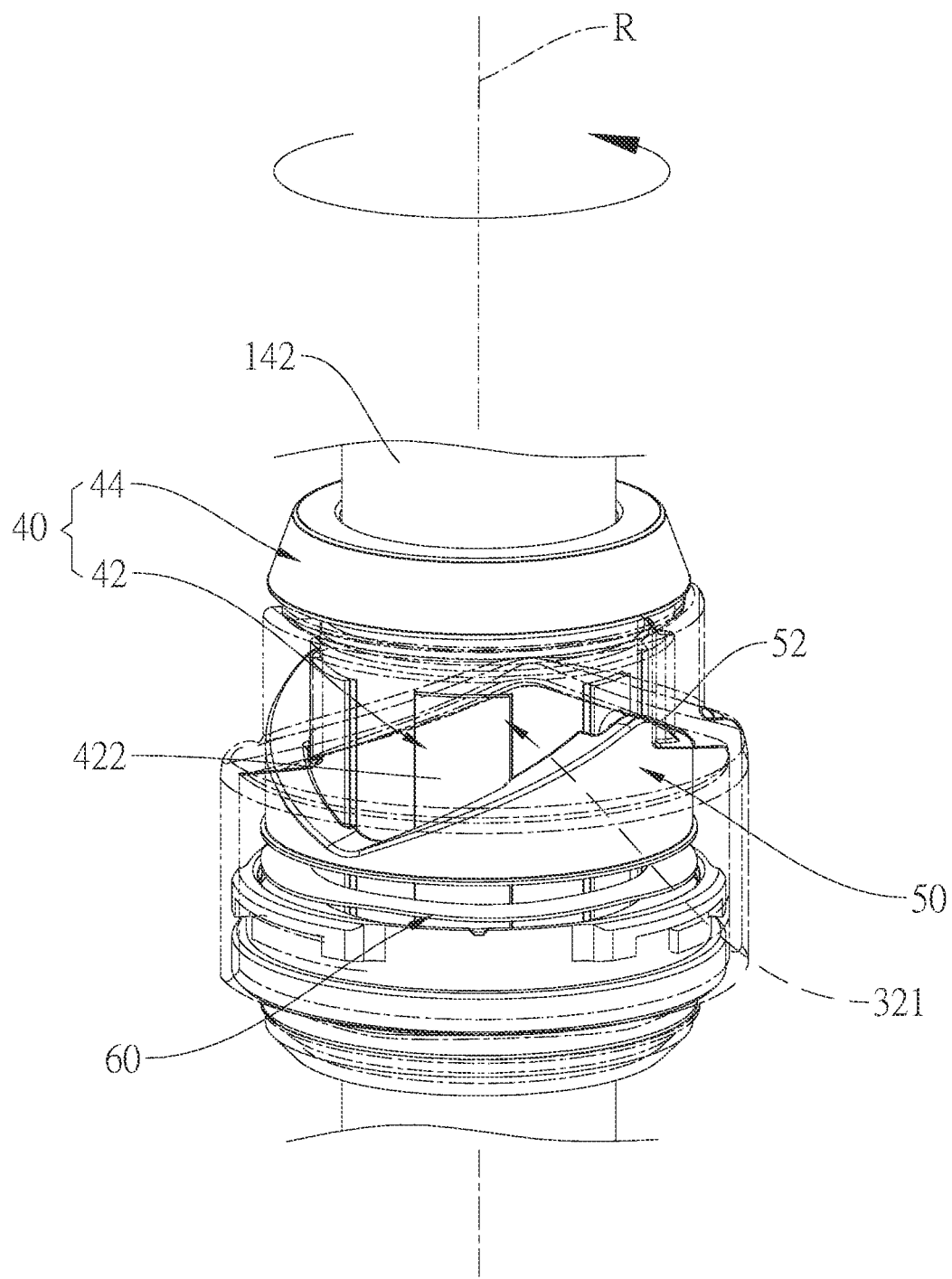
Figure 6C:
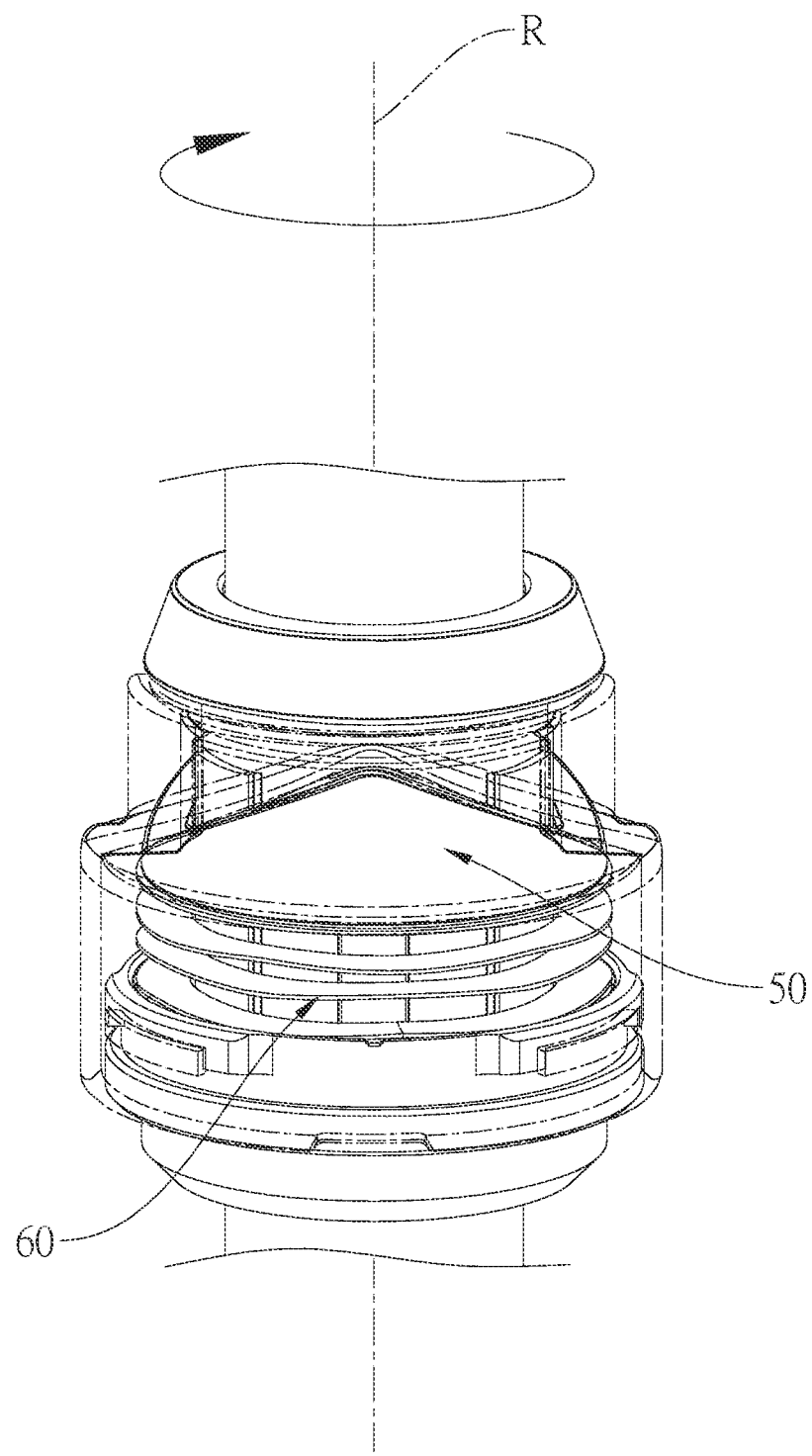

As illustrated in FIG. 3 and FIG. 6A to FIG. 6C, when the stem of the bicycle 10 is rotated to drive the steerer tube 142 to rotate the rotating member 40 either clockwise or counter-clockwise, the second contour 52 of the movable member 50 is rotated and is moved axially along either the first section 322 or the second section 323 of the first contour 321. In the current embodiment, when the movable member 50 is rotated counter-clockwise along the second section 323, the movable member 50 is moved downwardly (namely toward the headtube 121) relative to the rotating member 40. As the movable member 50 is moved downwardly, the elastic member 60 is gradually compressed by the movable member 50, so that the elastic member 60 generates a resilience that gradually increased and exerts the generated resilience to the movable member 50. During a steering process, the resilience provided by the elastic member 60 could resist the rotation of the steerer tube 142 and the stem. In order to illustrate easily, in the current embodiment, when the second contour 52 of the movable member 50 that is engaged with the rotatable member 40 completely abuts against the first contour 321 of the fixed member 30 as illustrated in FIG. 6A, a position of the movable member 50 and the rotatable member 40 is defined as an initial position. When the movable member 50 and the rotatable member 40 are turned back to locate in the initial position, the steerer tube 142 and the stem are steered back to allow a front wheel of the bicycle to align with a longitudinal direction of the frame 12.

When an external force exerted to the stem and the steerer tube 142 is turned to allow the stem and the steerer tube 142 to steer back, the resilience provided by the elastic member 60 could push the movable member 50 to allow the movable member 50 to tend to rotate back to the initial position along the surface of the first contour 321, thereby generating an auxiliary force to drive the rotating member 40 engaged with the movable member 50 to return back to the initial position and to assist the steerer tube 142 and the stem to be steered back. Such design is especially beneficial for a bicycle that carries goods or loads at a stem of the bicycle. When the bicycle carries loads at the stem, such design could prevent the stem from being overly turned and could assist the stem that is turned to be steered back, thereby allowing a rider to smoothly steer the stem of the bicycle via handlebars.

The following describes the structure of the current embodiment in detail. As illustrated in FIG. 2A to FIG. 2D and FIG. 4, the fixed member 30 includes a top cover 32 and a bottom cup 34. A bottom portion of the top cover 32 is detachably connected to the bottom cup 34. The bottom cup 34 is adapted to be engaged with the top end of the headtube 121. The top cover 32 is in a tapered round-tube shape, wherein the bottom portion of the top cover 32 is wider than a top portion of the top cover 32. The steerer tube 142 passes through a center of the top cover 32. The bottom portion of the top cover 32 fits around an outer circumference of a top portion of the bottom cup 34. A bottom portion of an inner circumference of the top cover 32 has a plurality of hooks 325 that are evenly spaced and arranged around the inner circumference. The first contour 321 is formed on one of the two half parts of the inner circumference of the top cover 32, wherein the first section 322 and the second section 323 face downwardly (namely face toward the bottom cup 34) and are symmetrical with respect to a sectional plane of the top cover 32 that includes the axis of rotation R and passes through the joint section 324. Each of the first section 322 and the second section 323 extends over a quarter of the inner circumference of the top cover 32 and could guide the rotation of the stem and the steerer tube 142 within 90 degrees. The joint section 324 is a joint site of the highest site of a surface of the first section 322 and the highest site of a surface of the second section 323. It should be noted that the highest site is a site that is located farthest away from the reference plane P.

As illustrated in FIG. 6A, in the current embodiment, the surface of the first section 322 and the surface of the second section 323 are tilted relative to the reference plane P. An angle θ1 formed between an extending direction V (Y-axis) of the axis of rotation R and the first section 322 is in a range of 45 to 75 degrees. An angle θ2 formed between an extending direction V (Y-axis) of the axis of rotation R and the second section 323 is in a range of 45 to 75 degrees. Preferably, the angles θ1, θ2 formed between the extending direction V (Y-axis) of the axis of rotation R and either the first section 322 or the second section 323 is 65.7 degrees. In other embodiments, the first section 322 and the second section 323 could be curved surface relative to the reference plane P. An angle formed between the extending direction V (Y-axis) of the axis of rotation R and a tangent line of the highest site of either the first section 322 or the second section 323 is in a range of 45 to 75 degrees.

Additionally, the other one of the two half parts of the inner circumference of the top cover 32 could form another first contour 321. Two first contours 321 have the same shape. Each of the first contours 321 has the first section 322 and the second section 323 that correspond to the clockwise direction of rotation and the counter-clockwise direction of rotation of the steerer tube 142, respectively, and the joint section 324 connects the first section 322 and the second section 323. The two first guiding sections 322 are located at opposite sides of the inner circumference of the top cover 32, and the two second sections 323 are similarly located at opposite sides of the inner circumference of the top cover 32. With such design, the movable member 50 could be guided by the opposite two first guiding sections 322 and the opposite two second sections 323 to rotate in the clockwise direction or in the counter-clockwise direction. Since the movable member 50 is touched by the symmetrical first contours 321, symmetrical sides of the movable member 50 could be pushed by the symmetrical first contours 321 simultaneously, thereby allowing the movable member 50 to move smoothly. However, the movable member 50 could still be moved when the top cover 32 has only one first contours 321 to guide one second contour 52 of the movable member 50.

The bottom cup 34 is a ring body. A bottom portion of an outer circumference of the bottom cup 34 has an engaging portion 341 for being engaged with the headtube 121, the engaging portion 341 is an annular stepped shape and is fixed to the top end of the headtube 121. A bottom surface of the inner side of the bottom cup 34 has a bearing bracket 342, wherein a bearing 343 is embedded in the bearing bracket 342. The top portion of the outer circumference of the bottom cup 34 has a plurality of slots 344 that are spaced evenly and arranged around the outer circumference and are adapted to be interlocked with the hooks 325 of the top cover 32. A number of the slots 344 is equal to a number of the hooks 325 of the top cover 32. A recess of each of the slots 344 faces downward (namely faces toward the headtube 121). When the bottom portion of the top cover 32 fits around the slots 34, each of the hooks 325 of the top cover 32 could be interlocked with one of the slot 344 of the bottom cup 34 to position the top cup 32.

The rotating member 40 includes a sliding track member 42 and a clamping ring 44, wherein the clamping ring 44 is engaged with a top end of the sliding track member 42. The sliding track member 42 is a cylinder and rotatably passes through the top cover 32. The sliding track member 42 fits around a circumference of the steerer tube 142. A top edge of the sliding track member 42 has protrusions and recesses so as to form a second positioning portion 421, wherein the second positioning portion 421 extends out of the top end of the top cover 32. An outer circumference of the sliding track member 42 has a second sliding track 422 that extends along an axial direction of the steerer tube 142. A bottom edge of the sliding track member 42 has a protrusion 423 projecting outward. The sliding track member 42 abuts against the bearing 343 in the bottom cup 34 via the protrusion 423 and is movable relative to the top cover 32.

The clamping ring 44 is a C-shaped ring and fits around the circumference of the steerer tube 142 to clamp onto the steerer tube 142. The clamping ring 44 is axially spaced (namely spaced along Y-axis) from a top surface of the top cover 32. A bottom portion of the clamping ring 44 has a first positioning portion 441 including protrusions and recesses. The first positioning portion 441 and the second positioning portion 421 of the top edge of the sliding track member 42 are fixed together by matching the recesses and the protrusions. Two free ends of the clamping ring 44 have two recesses 442 for receiving a fastener. Each of the two recesses 442 has a perforation 443. The fastener passes through the two perforations 443 to make the clamping ring 44 tightly clamp onto the steerer tube 142 and to fix the sliding track member 42 to the circumference of the steerer tube 142 as well, so that the sliding track member 42 could simultaneously rotate as the steerer tube 142 is rotated.

Figure 5A:
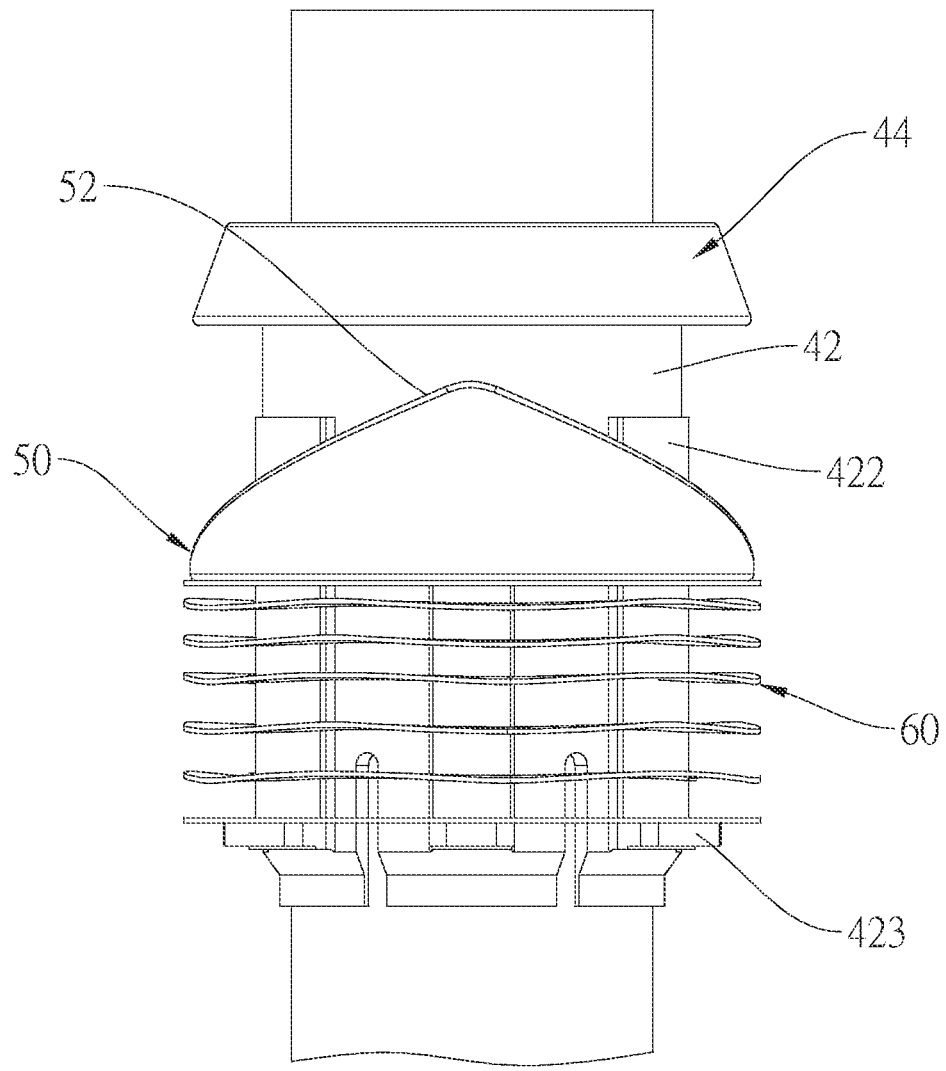
FIG. 5A and FIG. 5B are front views of the headset of the present disclosure without mounting the fixed member, showing the movable member is moved relative to the sliding track member.
Figure 5B:
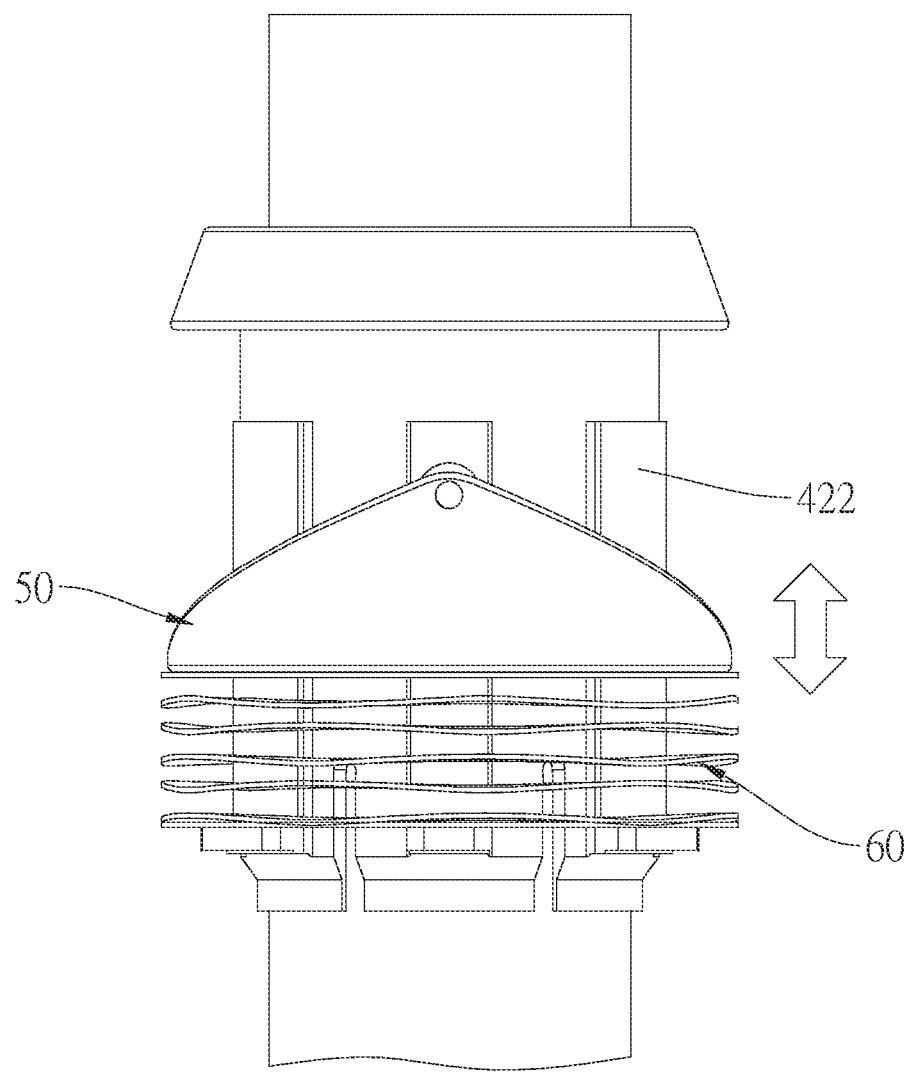

The movable member 50 is a ring body and fits around a circumference of the sliding track member 42. The movable member 50 is disposed in the top cover 32 and right under the two first contours 321. The second contour 52 is formed on a top portion of the movable member 50 and is located at one of two half parts of a circumference of the movable member 50. The shape of the second contour 52 matches the shape of the first contour 321. Another second contour 52 is formed at the top portion of the other one of two half parts of the circumference of the movable member 50 to correspond to another first contour 321. The shape of the another second contour 52 matches with the shape of the another first contour 321. Said second contours 52 have the same shape and respectively located at the radially opposite sides of the movable member 50. An inner circumference of the movable member 50 has a first sliding track 54 which is slidably moved along the second sliding track 422 of the sliding track member 42. As illustrated in FIG. 5A and FIG. 5B, the movable member 50 is restricted from rotating relative to the sliding track member 42 of the rotating member 40 and could merely move along the axial direction of the steerer tube 142.

The elastic member 60 fits around the circumference of the sliding track member 42, and two ends of the elastic member 60 abut against and are compressed by the protrusion 423 of the bottom edge of the sliding track member 42 and a bottom portion of the movable member 50, respectively. The elastic member 60 exerts force onto the movable member 50 to keep the two second contours 52 of the movable member 50 constantly touching the two first contours 321 of the fixed member 30.

The elastic member 60 urges the movable member 50 to make the movable member 50 constantly move toward the two first contours 321 of the top cover 32, so that except keeping the two second contours 52 in a state that the two second contours 52 constantly touches the first contours 321, the top cover 32 is constantly pushed by an upward force to keep the hooks 325 of the bottom portion of the top cover 32 in a state that the hooks 325 constantly interlock into the slots 344 of the bottom cup 34. When the top cover 32 needs to be detached from the bottom cup 34, the clamping ring 44 that is adapted to block the top cover 32 should be detached first, and then by pushing the top cover 32 downward by a force to disengage the hooks from the slots 344, the top cover 32 could be rotated to misalign the hooks 325 and the slots 344, thereby disengaging the top cover 32 from the bottom cup 34.

Regarding the headset 20 of the current embodiment according to the present disclosure, the first contour 321 is formed in the top cover 32 and the second contour 52 is formed on the movable member 50. In another embodiment, the shape of the second contour 52 of the movable member 50 and the shape of the first contour 321 of the top cover 30 could be inverted. At this time, the minimum distance between the joint section 324 of the first contour 321 of the top cover 32 and the reference plane P is shorter than a minimum distance between the reference plane P and any point on either the first section 322 or the second section 323. Additionally, the design of other structures of the another embodiment is the same as that of the aforementioned embodiment, such as a number of the first contour 321 and the second contour 52, the steering back efficacy demonstrated by the headset 20 when the rotation of the steerer tube 142 in the clockwise direction or the counter-clockwise direction. Therefore, the headset 20 of the another embodiment could prevent the stem from overly turned and assist the stem to steer back as well.

It must be pointed out that the embodiment described above is only a preferred embodiment of the present disclosure. All equivalent structures which employ the concepts disclosed in this specification and the appended claims should fall within the scope of the present disclosure.

What is claimed is:

1. A headset for a bicycle, wherein the bicycle comprises a frame and a fork; the frame has a headtube; the fork has a fork portion and a steerer tube that is connected to the fork portion; the steerer tube rotatably passes through the headtube, and an axis of rotation of the steerer tube is defined; wherein the headset comprises:
   a fixed member disposed on a top end of the headtube;
   a rotating member fixed to the steerer tube, wherein the rotating member is rotated as a rotation of the steerer tube;
   a movable member engaged with the rotating member and movable in a direction parallel to the axis of rotation without rotating relative to the rotating member;
   wherein a reference plane is defined to be perpendicular to the axis of rotation and pass through the top end of the headtube; one of the fixed member and the movable member has a first contour, and the other one of the fixed member and the movable member has a second contour; the first contour is located at an outside of the steerer tube and surrounds at least a part of a circumferential wall of the steerer tube; the first contour has a first section, a second section, and a joint site that is formed between the first section and the second section; when the fixed member has the first contour, a minimum distance between the joint section and the reference plane is greater than a minimum distance between any point of either the first section or the second section and the reference plane; when the movable member has the first contour, the minimum distance between the joint section and the reference plane is shorter than the minimum distance between any point of either the first section or the second section and the reference plane; and
   an elastic member adapted to urge the movable member in an axial direction of the axis of rotation to keep the second contour constantly touching the first contour of the fixed member.

2. The headset as claimed in claim 1, wherein the fixed member includes a top cover and a bottom cup; the bottom cup is engaged with the top end of the headtube, and a bottom portion of the top cover is detachably engaged with the bottom cup; the steerer tube passes through the top cover; the rotating member rotatably passes through the fixed member; the first contour is formed on the top cover, and the second contour is formed on the movable member.

3. The headset as claimed in claim 2, wherein the first contour is formed on an inner circumference of the top cover and extends over one of the two half parts of the inner circumference of the top cover; another first contour is formed on the other one of the two half parts of the inner circumference of the top cover; the two first contours have the same shape; the movable member has another second contour, wherein the two second contours have the same shape and respectively located at the radially opposite sides of the movable member; the elastic member keeps the another second contour constantly touching the first contour as well.

4. The headset as claimed in claim 3, wherein a bearing is embedded in a bottom portion of an inner side of the bottom cup; the rotating member comprises a sliding track member and a clamping ring; the sliding track member fits around a circumference of the steerer tube and passes through a top end of the top cover; an outer circumference of the sliding track member has a second sliding track that extends along an axial direction of the steerer tube; a bottom edge of the sliding track member is disposed with a protrusion, and the protrusion abuts against the bearing; the clamping ring is axially spaced from a top surface of the top cover and fixedly fits around the circumference of the steerer tube; a bottom portion of the clamping ring is engaged with a top end of the sliding track member; the movable member fits around the sliding track member in a manner axially slidable along the second sliding track; the elastic member fits around the outer circumference of the sliding track member, wherein two ends of the elastic member abut against and are compressed by the protrusion of the sliding track member and the movable member, respectively.

5. The headset as claimed in claim 4, wherein a bottom portion of the inner circumference of the top cover has a plurality of hooks that are evenly spaced and arranged around the inner circumference of the top cover; a top portion of an outer circumference of the bottom cup has a plurality of slots that are spaced evenly and arranged around the outer circumference of the bottom cup; a recess of each of the plurality of slots faces downward; each of the plurality of hooks upwardly interlocks with one of the plurality of slots to position the top cover.

6. The headset as claimed in claim 1, wherein a surface of the first section and a surface of the second section are tilted; an angle between the surface of the first section and an extending direction of the axis of rotation is equal to an angle between the surface of the second section and the extending direction of the axis of rotation; each of the angles is ranged between 45 and 75 degrees.

7. The headset as claimed in claim 6, wherein the angle, which is between the surface of the first section and the extending direction of the axis of rotation, and the angle, which is between the surface of the second section and the extending direction of the axis of rotation, are 65.7 degrees.

8. The headset as claimed in claim 1, wherein the fixed member has the first contour; a surface of the first section and a surface of the second section are concave curved; an angle between a tangent line of the highest point of the surface of the first section and an extending direction of the axis of rotation is ranged between 45 and 75 degrees; an angle between a tangent line of the highest point of the surface of the second section is ranged between 45 and 75 degrees.

\* \* \* \* \*